US011363030B2

(12) United States Patent
Prasad et al.

(10) Patent No.: US 11,363,030 B2
(45) Date of Patent: Jun. 14, 2022

(54) SYSTEMS AND METHODS FOR CATEGORIZED HIERARCHICAL VIEW AND MODIFICATION OF USER ACCESSIBILITY TO INFORMATION TECHNOLOGY ITEM

(71) Applicant: ServiceNow, Inc., Santa Clara, CA (US)

(72) Inventors: Harshvardhan Prasad, Hyderabad (IN); Brijesh Pandey, Hyderabad (IN); Shouvik Goswami, Hyderabad (IN)

(73) Assignee: ServiceNow, Inc., Santa Clara, CA (US)

( * ) Notice: Subject to any disclaimer, the term of this patent is extended or adjusted under 35 U.S.C. 154(b) by 582 days.

(21) Appl. No.: 16/242,820

(22) Filed: Jan. 8, 2019

(65) Prior Publication Data
US 2020/0220877 A1    Jul. 9, 2020

(51) Int. Cl.
*G06F 16/28*    (2019.01)
*G06F 21/62*    (2013.01)
*H04L 9/40*    (2022.01)

(52) U.S. Cl.
CPC .......... *H04L 63/104* (2013.01); *G06F 16/287* (2019.01); *G06F 21/6218* (2013.01); *H04L 63/101* (2013.01)

(58) Field of Classification Search
None
See application file for complete search history.

(56) References Cited

U.S. PATENT DOCUMENTS

| 6,609,122 B1 | 8/2003 | Ensor |
| 6,678,695 B1 * | 1/2004 | Bonneau ........... G06F 16/24575 |
| 7,013,290 B2 * | 3/2006 | Ananian ................ G06Q 30/02 705/26.42 |
| 7,020,706 B2 | 3/2006 | Cates |
| 7,028,301 B2 | 4/2006 | Ding |

(Continued)

OTHER PUBLICATIONS

Calanducci et al "A Digital Library Management System for Grid," 16th IEEE International Workshops on Enabling Technologies: Infrastructure for Collaborative Enterprises (WETICE 2007), pp. 269-272.*

(Continued)

*Primary Examiner* — Luu T Pham
*Assistant Examiner* — James J Wilcox
(74) *Attorney, Agent, or Firm* — Fletcher Yoder PC

(57) ABSTRACT

The present disclosure includes systems and methods that provide a control that enables entry of a user and a catalog item. In response to this entry, a visual representation of the categorized hierarchy of the catalog item and categories (collectively "catalog entities") to which the catalog item belongs are displayed. Each displayed catalog entity may include a visual indication of whether the catalog entity is accessible to the user. In some embodiments, the displayed catalog entity may include a control that enables or disables access to the catalog entity. The displayed catalog entity may also include a control that displays user groupings that have access or do not have access to that displayed catalog entity. An indication of whether the user belongs to each user grouping may also be displayed. Each displayed user group may include a control that enables modification to the definition of the displayed user grouping.

20 Claims, 10 Drawing Sheets

(56) References Cited

U.S. PATENT DOCUMENTS

| | | | |
|---|---|---|---|
| 7,062,683 B2 | 6/2006 | Warpenburg | |
| 7,131,037 B1 | 10/2006 | LeFaive | |
| 7,170,864 B2 | 1/2007 | Matharu | |
| 7,543,329 B2* | 6/2009 | Viets | G06F 21/6218 726/2 |
| 7,546,633 B2* | 6/2009 | Garg | G06F 21/602 713/170 |
| 7,610,512 B2 | 10/2009 | Gerber | |
| 7,617,073 B2 | 11/2009 | Trinon | |
| 7,689,628 B2 | 3/2010 | Garg | |
| 7,716,089 B1* | 5/2010 | Gavarini | G06Q 50/188 705/26.8 |
| 7,783,744 B2 | 8/2010 | Garg | |
| 7,890,802 B2 | 2/2011 | Gerber | |
| 7,930,396 B2 | 4/2011 | Trinon | |
| 7,945,860 B2 | 5/2011 | Vambenepe | |
| 7,966,398 B2 | 6/2011 | Wiles | |
| 8,051,164 B2 | 11/2011 | Peuter | |
| 8,224,683 B2 | 7/2012 | Manos | |
| 8,266,096 B2 | 9/2012 | Navarrete | |
| 8,457,928 B2 | 6/2013 | Dang | |
| 8,478,569 B2 | 7/2013 | Scarpelli | |
| 8,674,992 B2 | 3/2014 | Poston | |
| 8,689,241 B2 | 4/2014 | Naik | |
| 8,743,121 B2 | 6/2014 | De Peuter | |
| 8,789,205 B2* | 7/2014 | Ramaswamy | G06F 3/048 726/28 |
| 8,887,133 B2 | 11/2014 | Behnia | |
| 9,065,783 B2 | 6/2015 | Ding | |
| 9,122,552 B2 | 9/2015 | Whitney | |
| 9,213,856 B2* | 12/2015 | Kornmann | G06F 21/6218 |
| 9,239,857 B2 | 1/2016 | Trinon | |
| 9,535,737 B2 | 1/2017 | Joy | |
| 9,557,969 B2 | 1/2017 | Sharma | |
| 9,792,387 B2 | 10/2017 | George | |
| 10,223,366 B2* | 3/2019 | Lim | G06F 16/176 |
| 10,417,246 B1* | 9/2019 | Bonneau | G06Q 30/0641 |
| 10,739,983 B1* | 8/2020 | Miriyala | G06F 3/0484 |
| 10,860,860 B1* | 12/2020 | Huynh | H04N 21/84 |
| 10,924,542 B2* | 2/2021 | Khaimov | H04L 67/2814 |
| 11,223,626 B2* | 1/2022 | Gormley | G06F 16/9535 |
| 2004/0036716 A1* | 2/2004 | Jordahl | G06F 16/24578 715/713 |
| 2012/0227004 A1* | 9/2012 | Madireddi | G06Q 10/06 715/771 |
| 2014/0325331 A1* | 10/2014 | Madireddi | G06F 40/174 715/224 |
| 2015/0040225 A1* | 2/2015 | Coates | H04L 63/1408 726/23 |
| 2015/0350194 A1* | 12/2015 | Gilpin | H04L 63/102 726/8 |
| 2016/0070731 A1* | 3/2016 | Chang | G06F 16/958 707/741 |
| 2019/0361945 A1* | 11/2019 | Chang | G06Q 30/00 |

OTHER PUBLICATIONS

Ho et al "Group Access Control with Blacklist for Data Dissemination in Mobile Opportunistic Networks," 2013 IEEE Wireless Communications and Networking Conference (WCNC): Services & Applications, pp. 4410-4415 (Year: 2013).*

Qu-"Research on Semantic Information Resource Catalog," 2010 Second International Conference on Computational Intelligence and Natural Computing (CINC), pp. 65-68 (Year: 2010).*

* cited by examiner

| ☰ AVAILABLE FOR | NEW | EDIT... | SEARCH | AVAILABLE FOR ▾ | SEARCH | AVAILABLE FOR (2) | NOT AVAILABLE FOR (1) | CATEGORIES (2) | CATALOGS (1) |

CATALOG ITEM = PHONE ⟵ 222
≡ = AVAILABLE FOR ⟵ 272

☐ ⊙ APAC EMPLOYEES ⟵ 274
☐ ⊙ US SALES ⟵ 276

☐ ACTIONS ON SELECTED ROWS... ⌄

| ☰ NOT AVAILABLE FOR | NEW | EDIT... | SEARCH | FOR TEXT ▾ | SEARCH | AVAILABLE FOR (2) | NOT AVAILABLE FOR (1) | CATEGORIES (2) | CATALOGS (1) |

CATALOG ITEM = PHONE ⟵ 222
≡ = NOT AVAILABLE FOR ⟵ 292

☐ ⊙ APAC HR ⟵ 294

☐ ACTIONS ON SELECTED ROWS... ⌄

SYSTEMS AND METHODS FOR CATEGORIZED HIERARCHICAL VIEW AND MODIFICATION OF USER ACCESSIBILITY TO INFORMATION TECHNOLOGY ITEM

BACKGROUND

The present disclosure relates generally to user accessibility of information technology items, and more particularly to providing a hierarchical view and enabling convenient modification of user accessibility of the information technology items.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations, regardless of size, rely upon access to information technology (IT) and data and services for their continued operation and success. A respective organization's IT infrastructure may have associated hardware resources (e.g. computing devices, load balancers, firewalls, switches, etc.) and software resources (e.g. productivity software, database applications, custom applications, and so forth). Over time, more and more organizations have turned to cloud computing approaches to supplement or enhance their IT infrastructure solutions.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations, which resources may be used to perform a variety of computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

A cloud-based information technology platform may include a virtual server that enables a client instance. The client instance may execute a catalog software application that provides a categorized hierarchy of "catalog items" (which may include items, services, and offerings) to users. Each catalog item may be included in multiple categories of the categorized hierarchy. As such, the catalog software application may provide multiple hierarchically categorized paths to a catalog item.

Each catalog entity (which may include categories and catalog items) may be included on a user-accessible list and a user-inaccessible list. The user-accessible list may include users who are allowed access to a respective catalog entity, while the user-inaccessible list may include users who are not allowed access to the respective catalog entity. While each list may list specific users, each list may additionally or alternatively list users through user groupings (which may include user groups, roles, companies, locations, or departments).

As a user browses through the catalog items in the catalog software application, the client instance may check if the user is on the user-accessible list and is not on the user-inaccessible list. If so, the user may access the catalog item.

At times, users may report issues relating to not having to access certain catalog items in the catalog software application. To address these issues, a system administrator may review the user-accessible and user-inaccessible lists to see if and how the user is represented (as a user or one or more user groupings). This review may often be tedious, time-consuming, and inefficient.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure includes systems and methods that provide a control that enables entry of a user and a catalog item. In response to this entry, a visual representation of the categorized hierarchy of the catalog item and categories (collectively "catalog entities") to which the catalog item belongs are displayed. Each displayed catalog entity may include a visual indication of whether the catalog entity is accessible or inaccessible to the user. In some embodiments, the displayed catalog entity may include a control that enables or disables access to the catalog entity. The displayed catalog entity may also include a control that, when selected, displays user groupings that have access or do not have access to that displayed catalog entity. An indication of whether the user belongs to each user grouping may also be displayed. Each displayed user group may include a control that, when selected, enables modification to the definition of the displayed user grouping.

In this manner, the disclosed systems and methods provide an easily digestible way for a system administrator to get a full picture of a user's accessibility to an information technology item and conveniently change the user's accessibility to that information technology item.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 6 is an example user interface displaying a user-accessible list for the catalog item of FIG. 4, in accordance to an embodiment of the present disclosure;

FIG. 7 is an example user interface displaying a user-inaccessible list for the catalog item of FIG. 4, in accordance to an embodiment of the present disclosure;

DETAILED DESCRIPTION

Figure 1:
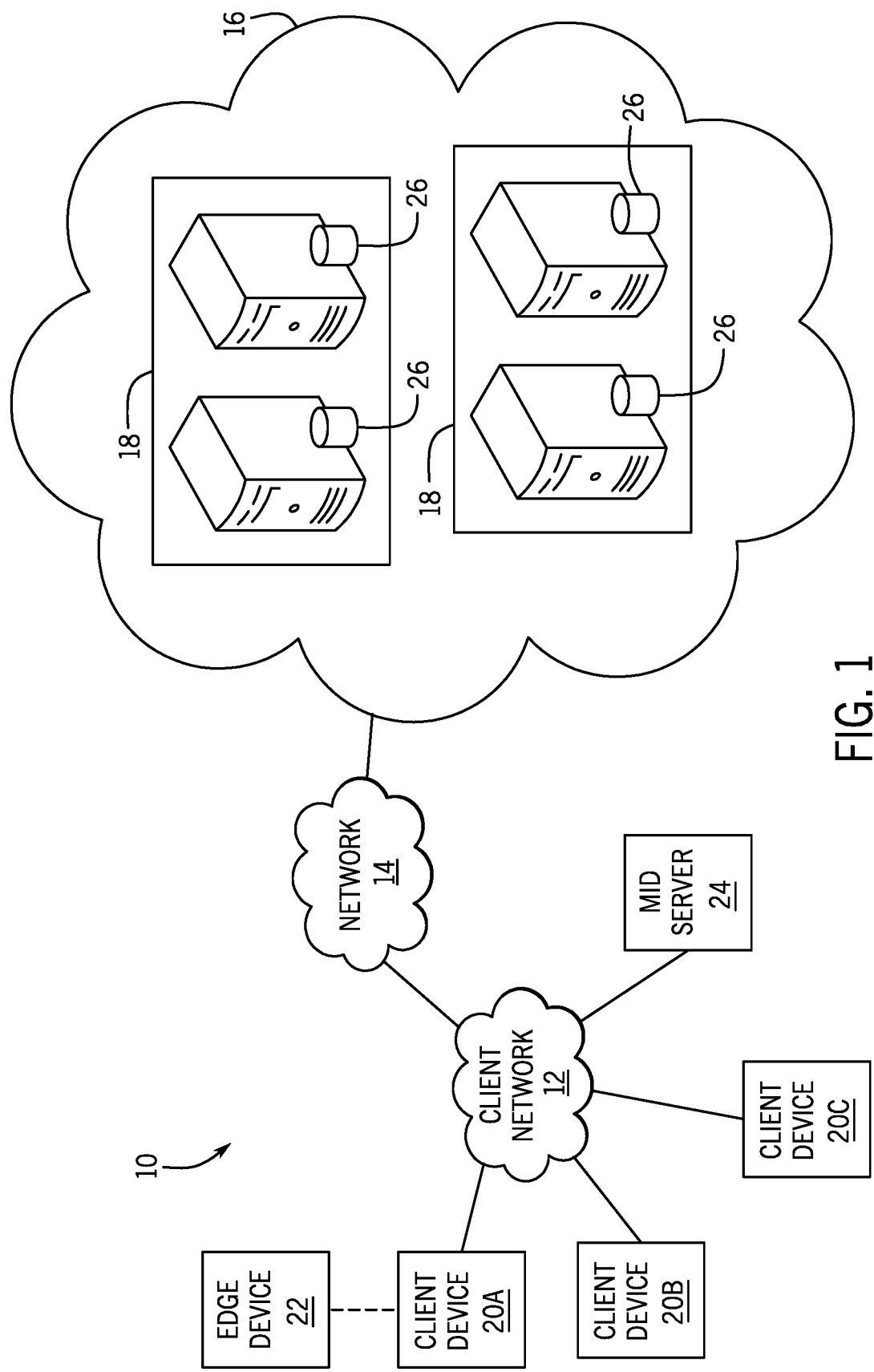
FIG. 1 is a block diagram of an embodiment of a cloud architecture in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code.

A cloud-based information technology platform may include a virtual server that enables a client instance. The client instance may execute a catalog software application that provides a categorized hierarchy of "catalog items" (which may include items, services, and offerings) to users. Each catalog item may be included in multiple categories of the categorized hierarchy. As such, the catalog software application may provide multiple hierarchically categorized paths to a catalog item.

Each catalog entity (which may include categories and catalog items) may be included on a user-accessible list and a user-inaccessible list. The user-accessible list may include users who are allowed access to a respective catalog entity, while the user-inaccessible list may include users who are not allowed access to the respective catalog entity. While each list may list specific users, each list may additionally or alternatively list users through user groupings (which may include user groups, roles, companies, locations, or departments).

As a user browses through the catalog items in the catalog software application, the client instance may check if the user is on the user-accessible list and is not on the user-inaccessible list. If so, the user may access the catalog item. In some embodiments, there may only be a user-accessible list and no user-inaccessible list, and the client instance may allow access to the catalog item if the user is on the user-accessible list. In additional or alternative embodiments, there may only be a user-inaccessible list and no user-accessible list, and the client instance may allow access to the catalog item if the user is not on the user-inaccessible list.

At times, users may report issues relating to not having to access certain catalog items in the catalog software application. To address these issues, a system administrator may review the user-accessible and user-inaccessible lists to see if and how the user is represented (as a user or in one or more user groupings). This review may often be tedious, time-consuming, and inefficient.

The present disclosure includes systems and methods that provide a control that enables entry of a user and a catalog item. In response to this entry, a visual representation of the categorized hierarchy of the catalog item and categories (collectively "catalog entities") to which the catalog item belongs are displayed. Each displayed catalog entity may include a visual indication of whether the catalog entity is accessible or inaccessible to the user. In some embodiments, the displayed catalog entity may include a control that enables or disables access to the catalog entity. The displayed catalog entity may also include a control that, when selected, displays user groupings that have access or do not have access to that displayed catalog entity. An indication of whether the user belongs to each user grouping may also be displayed. Each displayed user group may include a control that, when selected, enables modification to the definition of the displayed user grouping.

In this manner, the disclosed systems and methods provide an easily digestible way for a system administrator to get a full picture of a user's accessibility to an information technology item and conveniently change the user's accessibility to that information technology item.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 where embodiments of the present disclosure may operate, is illustrated. The cloud computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an administration or managerial device or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server and dedicated database server. In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
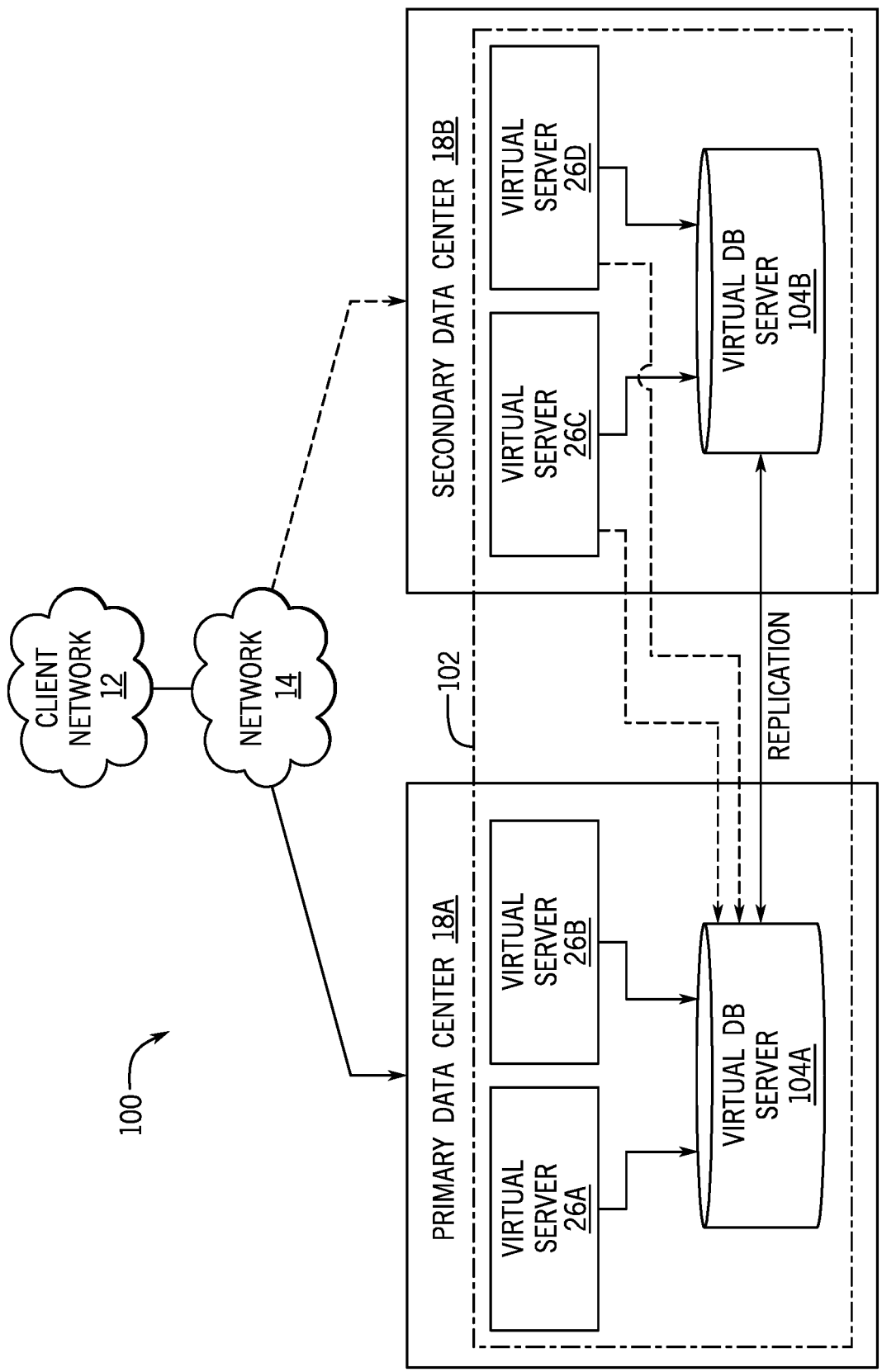
FIG. 2 is a schematic diagram of an embodiment of a multi-instance cloud architecture in which embodiments of the present disclosure may operate.

FIG. 2 is a schematic diagram of an embodiment of a multi-instance cloud architecture 100 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another. Using FIG. 2 as an example, network environment and service provider cloud infrastructure client instance 102 (also referred to herein as a client instance 102) is associated with (e.g., supported and enabled by) dedicated virtual servers (e.g., virtual servers 26A, 26B, 26C, and 26D) and dedicated database servers (e.g., virtual database servers 104A and 104B). Stated another way, the virtual servers 26A-26D and virtual database servers 104A and 104B are not shared with other client instances and are specific to the respective client instance 102. In the depicted example, to facilitate availability of the client instance 102, the virtual servers 26A-26D and virtual database servers 104A and 104B are allocated to two different data centers 18A and 18B so that one of the data centers 18 acts as a backup data center. Other embodiments of the multi-instance cloud architecture 100 could include other types of dedicated virtual servers, such as a web server. For example, the client instance 102 could be associated with (e.g., supported and enabled by) the dedicated virtual servers 26A-26D, dedicated virtual database servers 104A and 104B, and additional dedicated virtual web servers (not shown in FIG. 2).

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
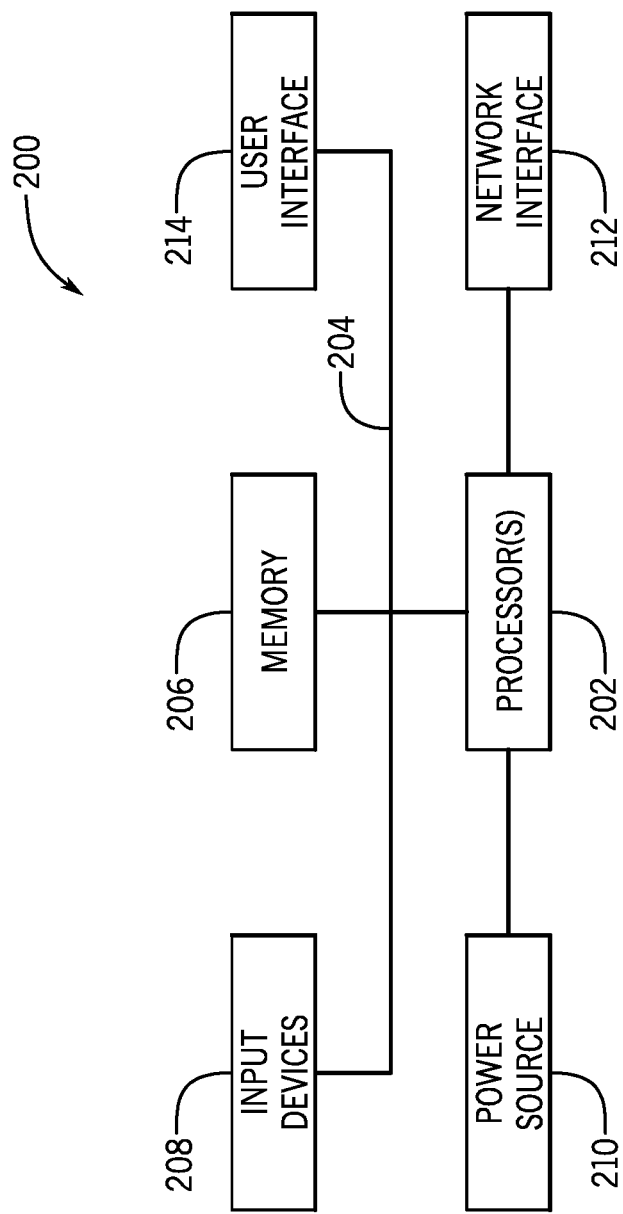
FIG. 3 is a block diagram of a computing device utilized in a computing system that may be present in FIG. 1 or 2, in accordance with aspects of the present disclosure.

By way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system or device 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 include suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processors 202. For example, the input devices 208 may include a mouse, touchpad, touchscreen, keyboard and the like. The power source 210 can be any suitable source for power of the various components of the computing device 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4:
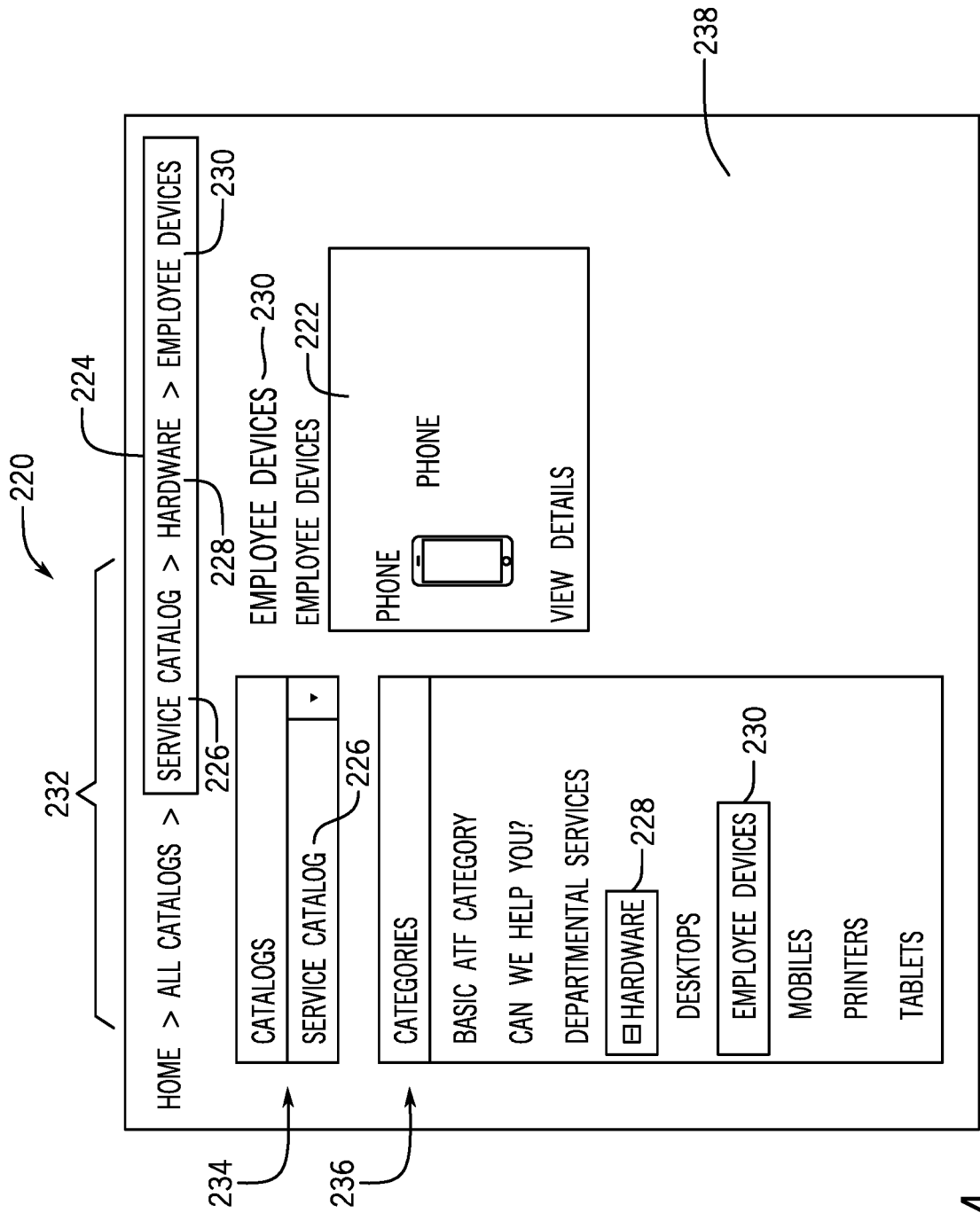
FIG. 4 is an example user interface of a catalog software application executed by a client instance of FIG. 2 displaying a catalog item via a first hierarchically categorized path, in accordance to an embodiment of the present disclosure.

With the preceding background discussion in mind, a client instance 102 as discussed herein may execute a catalog software application that provides a categorized hierarchy of "catalog items" (which may include items, services, and offerings) to users operating client devices 20 or edge device 22. Each catalog item may be included in multiple categories of the categorized hierarchy. As such, the catalog software application may provide multiple hierarchically categorized paths to a catalog item. For example, FIG. 4 is an example user interface 220 of the catalog software application executed by the client instance 102 of FIG. 2 displaying a catalog item 222 via a first hierarchically categorized path 224, in accordance to an embodiment of the present disclosure. As illustrated, the catalog item 222 is a phone, and the first categorized path 224 to the phone 222 includes a catalog 226 ("Service Catalog") and hierarchical categories 228, 230 ("Hardware" and "Employee Devices," respectively). The first categorized path 224 may be combined with a catalog path 232 that defines the hierarchy of catalogs that the Service Catalog 226 (and the Phone catalog item 222) belongs to ("All Catalogs"). In some embodiments, the first categorized path 224 may include the catalog path 232.

As illustrated, the user interface 220 provides navigational menus 234, 236 that may facilitate navigating to the catalog item 222, including a catalog menu 234 that enables selection of a catalog 226 (e.g., the Service Catalog) and a category menu 236 that enables selection of categories 226, 228 (e.g., Hardware and Employee Devices). In particular, to navigate to the catalog item 222, a user may select the Service Catalog 226 using the catalog menu 234, which may populate the category menu 236 with categories belonging to the Service Catalog 226. The user may then select the Hardware category 228, which populates the category menu 236 with sub-categories belonging to the Hardware category 228. The user may select the Employee Devices category 230, which displays the Phone catalog item 222 in a catalog item pane 238 of the user interface 220. As such, the first categorized path 224 to the Phone catalog item 222 includes the Service Catalog 226, the Hardware category 228, and the Employee Devices category 230.

Figure 5:
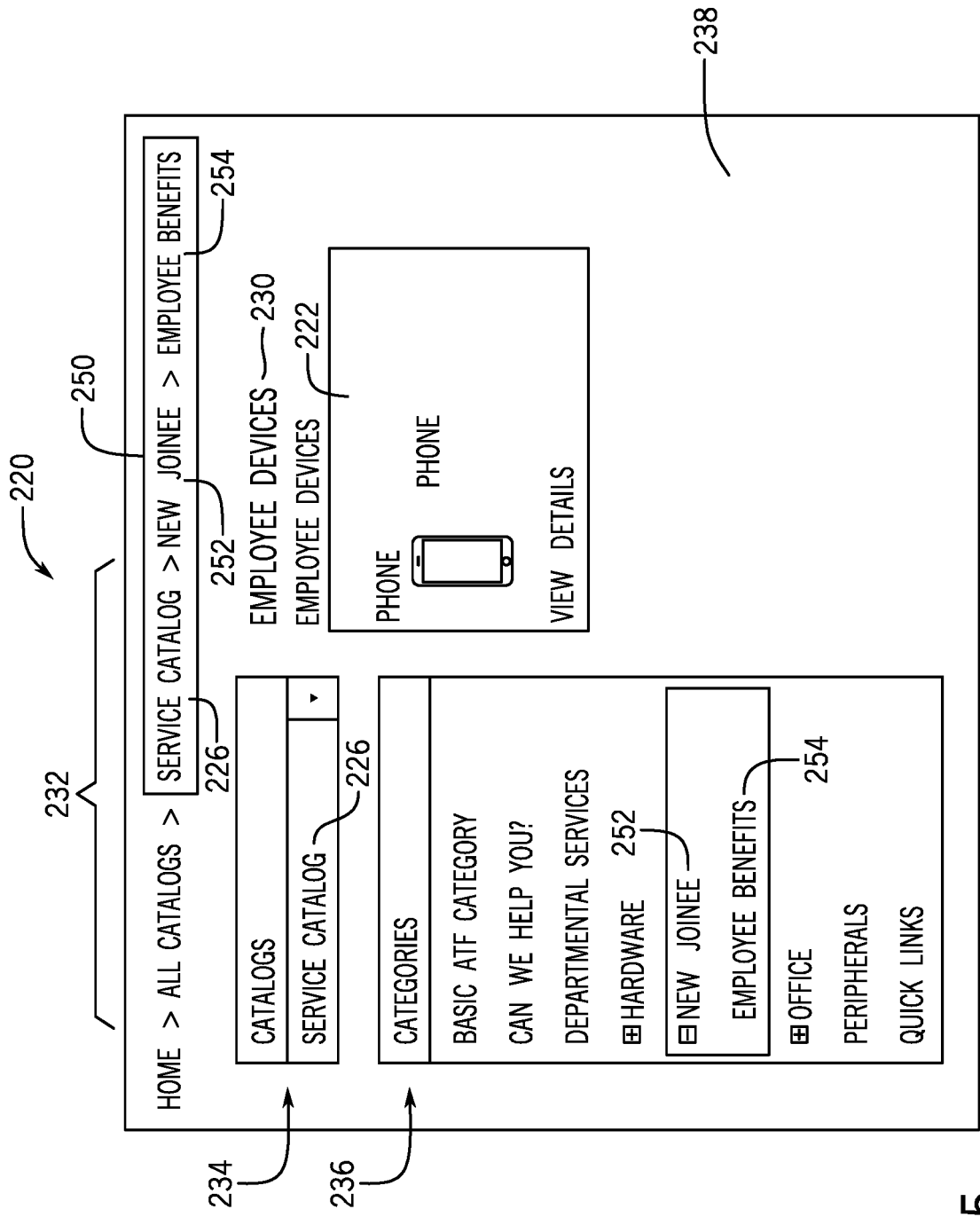
FIG. 5 is the example user interface of the catalog software application displaying the catalog item of FIG. 4 via a second hierarchically categorized path, in accordance to an embodiment of the present disclosure.

FIG. 5 is the example user interface 220 of the catalog software application displaying the catalog item 222 of FIG. 4 via a second hierarchically categorized path 250, in accordance to an embodiment of the present disclosure. As illustrated, the second categorized path 250 to the phone 222 includes the Service Catalog 226 and hierarchical categories 252, 254 ("New Joinee" and "Employee Benefits," respectively). The second categorized path 250 may be combined with the catalog path 232 that defines the hierarchy of catalogs that the Service Catalog 226 (and the Phone catalog item 222) belongs to ("All Catalogs"). In some embodiments, the second categorized path 250 may include the catalog path 232. As illustrated, the second categorized path 250 to the Phone catalog item 222 includes the Service Catalog 226, the New Joinee category 252, and the Employee Benefits category 254. Navigating through the second categorized path 250 may result in displaying the Phone catalog item 222 in the catalog item pane 238 of the user interface 220.

Each catalog entity, which may include categories and catalog items (e.g., the Hardware category 228, the Employee Devices category 230, the New Joinee category 252, the Employee Benefits category 254, and the Phone catalog item 222) may be included on a user-accessible list and a user-inaccessible list. FIG. 6 is an example user interface 270 displaying a user-accessible list 272 for the catalog item 222 of FIG. 4, in accordance to an embodiment of the present disclosure. The user-accessible list 272 includes users or user groupings that are allowed access to the Phone catalog item 222. In this case, the user-accessible list 272 shows that the Phone catalog item 222 is available for an "APAC Employees" user grouping 274 and a "US Sales" user grouping 276. In some embodiments, the user interface 270 may be combined with the user interface 220 of FIGS. 4 and 5. For example, the user interface 220 of FIGS. 4 and 5 may be a user's view (or ordering/requesting experience) of the Phone catalog item 222, while the user interface 270 may be part of a system administrator's view for maintaining the user's view (or ordering/requesting experience) of the Phone catalog item 222. In particular, the user interface 220 of FIGS. 4 and 5 may be a top portion of a user interface of a system administrator's view for maintaining the user's view (or ordering/requesting experience) of the Phone catalog item 222, while the user interface 270 may be a bottom portion of the same user interface.

FIG. 7 is an example user interface 290 displaying a user-inaccessible list 292 for the catalog item 222 of FIG. 4, in accordance to an embodiment of the present disclosure. The user-inaccessible list 292 includes users or user groupings that are not allowed access to the Phone catalog item 222. In this case, the user-inaccessible list 292 shows that the Phone catalog item 222 is unavailable for an "APAC HR" user grouping 294. In some embodiments, the user interface 270 may be combined with the user interface 220 of FIGS. 4 and 5. For example, the user interface 220 of FIGS. 4 and 5 may be a user's view (or ordering/requesting experience) of the Phone catalog item 222, while the user interface 290 may be part of a system administrator's view for maintaining the user's view (or ordering/requesting experience) of the Phone catalog item 222. In particular, the user interface 220 of FIGS. 4 and 5 may be a top portion of a user interface of a system administrator's view for maintaining the user's view (or ordering/requesting experience) of the Phone catalog item 222, while the user interface 290 may be a bottom portion of the same user interface.

Figure 8:
FIG. 8 is an example user interface for defining a user grouping, in accordance to an embodiment of the present disclosure.

A user grouping (e.g., the APAC Employees user grouping 274, the US Sales user grouping 276, and the APAC HR user grouping 294) may include user groups, roles, companies, locations, departments, and so on. FIG. 8 is an example user interface 310 for defining a user grouping 312, in accordance to an embodiment of the present disclosure. As illustrated, the user grouping 312 may be defined through identifying users 314, user groups 316, roles 318, companies 320, locations 322, and departments 324, though it should be understood that a user grouping 312 may be defined through any suitable user relationship or structure.

As a user browses through the catalog items (e.g., the Phone catalog item 222) in the catalog software application, the client instance 102 may check if the user is on the user-accessible list 272 and is not on the user-inaccessible list 292. If so, the client instance 102 may allow the user to access the catalog item 222. If the user is not on the user-accessible list 272 or is on the user-inaccessible list 292, then the client instance 102 may not allow the user to access the catalog item 222. In some cases, the client instance 102 may display the catalog item 222, but not enable the user to make changes to the catalog item 222. In other cases, the client instance 102 may display the catalog item 222, but hide some information associated with the catalog item 222 from the user. In yet other cases, the client instance 102 may not display the catalog item 222 at all.

At times, users may report issues relating to not having to access certain catalog items 222 in the catalog software application. To address these issues, a system administrator may review the user-accessible list 272 and/or the user-inaccessible list 292 to see if and how the user is represented (as a user or in one or more user groupings 312). This review may often be tedious, time-consuming, and inefficient.

Figure 9:
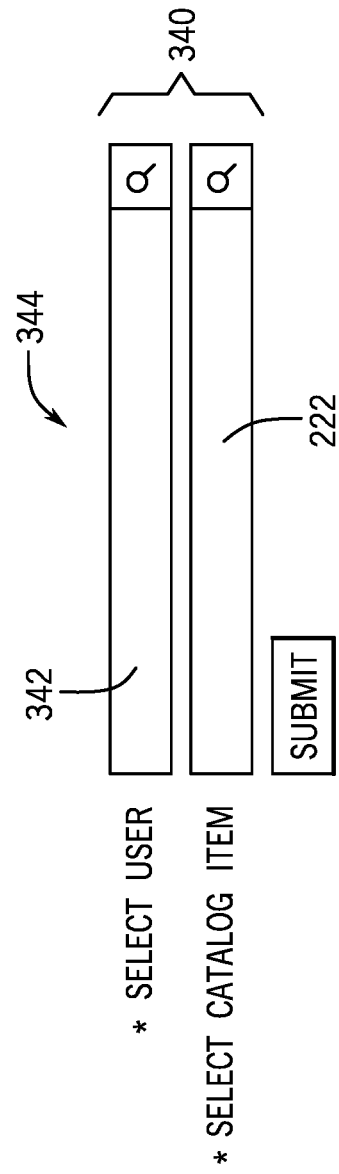
FIG. 9 is an example user interface displaying an entry control that enables entry of a user and a catalog item, in accordance to an embodiment of the present disclosure.
Figure 10:
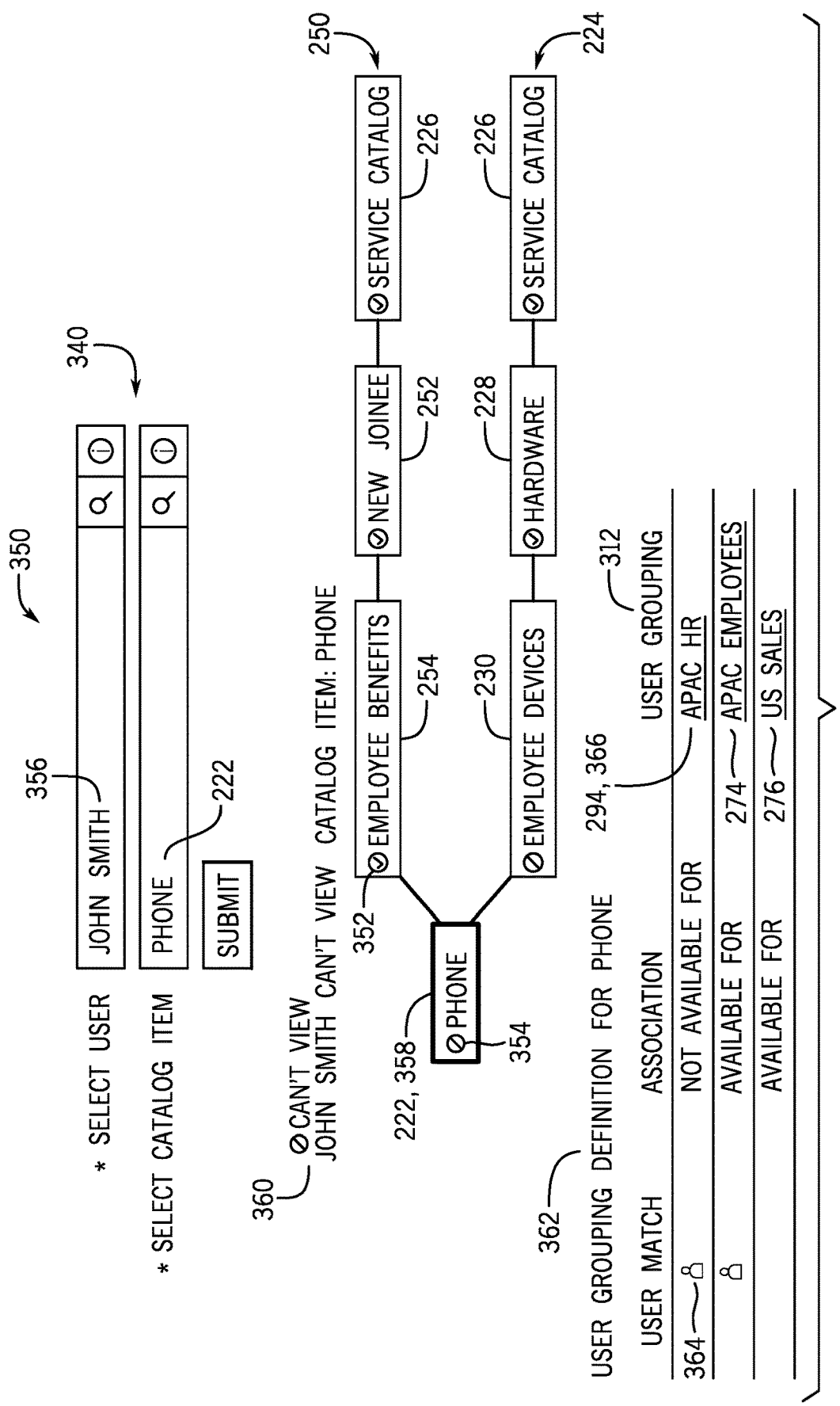
FIG. 10 is an example user interface of the catalog software application displaying two hierarchically categorized paths to the catalog item of FIG. 4 with a first catalog entity selected, in accordance to an embodiment of the present disclosure.

The present disclosure provides an entry control 340 that enables entry of a user 342 and a catalog item 222, such as that shown in the example user interface 344 of FIG. 9, by, for example, a system administrator, in accordance to an embodiment of the present disclosure. In response to the entry of the user 342 and the catalog item 222, the client instance 102 may display one or more hierarchically categorized paths (e.g., 224, 250) to the catalog item 222 with indications of whether each catalog entity is accessible or inaccessible to the user 342. FIG. 10 is an example user interface 350 of the catalog software application displaying two hierarchically categorized paths 224, 250 to the catalog item 222 of FIG. 4 with a first catalog entity (e.g., the Phone catalog item 222) selected, in accordance to an embodiment of the present disclosure. The hierarchically categorized paths 224, 250 include access indications of whether each catalog entity (e.g., the Phone catalog item 222, the Employee Benefits 254, and so on) is accessible 352 or inaccessible 354 to the user 342. As illustrated, the entry control 340 may be a portion (e.g., a top portion) of the user interface 350. In particular, the user interface 350 shows the hierarchically categorized paths 224, 250 to the Phone catalog item 222, and accessibility for the user "John Smith" 356, as provided by the entry control 340.

For each catalog entity of the hierarchically categorized paths 224, 250, the client instance 102 may provide a visual access indication of whether the catalog entity is accessible 352 or inaccessible 354 to the user 342. For example, the category Employee Benefits 254 includes a visual access indication 352 in the form of a checkmark to indicate that the category is accessible to the user 342. Similarly, the Phone catalog item 222 includes a visual access indication 354 in the form of a "no" symbol to indicate that the category is inaccessible to the user 342. It should be understood that the indications 352, 354 may be in any suitable form that indicates that a catalog entity is accessible or inaccessible to a user.

Each catalog entity may include a catalog entity selection control (e.g., 358) that enables the catalog entity to be selected. For example, in FIG. 10, the catalog entity selection control 358 of the Phone catalog item 222 has been selected, as indicated by the Phone catalog item 222 being shaded. The user interface 350 may provide a summary 360 that identifies the selected catalog entity (e.g., the Phone catalog item 222) and the accessibility of the catalog entity to the user 356 (e.g., "John Smith can't view Catalog Item: Phone"), in response to the catalog entity selection control 358 being selected.

Additionally, the user interface 350 may display a list 362 of user groupings 312 that are associated with the catalog entity, in response to the catalog entity selection control 358 being selected. The list 362 may include users 342 or user groupings 312 that are allowed to access the selected catalog entity, as shown in the user-accessible list 272 of FIG. 6, as well as the users 342 or user groupings 312 that are not allowed to access the selected catalog entity, as shown in the user-inaccessible list 292 of FIG. 7. For example, the list 362 includes the APAC HR user grouping 294 displayed in the user-accessible list 272 of FIG. 6 with respect to the Phone catalog item 222, and the APAC Employees user grouping 274 and the US Sales user grouping 276 displayed in the user-inaccessible list 292 of FIG. 7 with respect to the Phone catalog item 222. The list 362 also displays a user indication 364 of whether the user 356 is part of or a member of each displayed user 342 or user grouping 312. It should be understood that, while the user indication 364 is illustrated as a user icon, the user indication 364 may be in any suitable form that indicates that a user 356 belongs to a user grouping 312.

Each user 342 or user grouping 312 displayed in the list 362 may include a user grouping selection control 366 that enables selection of the displayed user 342 or user grouping 312. In response to a user grouping selection control 366 being selected, the client instance 102 may enable the system administrator to modify the associated user or user grouping definition. For example, in response to a user grouping selection control 366 associated with a user grouping 312 being selected, the client instance 102 may display the user interface of FIG. 8 that defines the user grouping 312. The system administrator may then change the definition of the user grouping 312 (e.g., by adding or removing the user 356 from the user grouping 312). In some embodiments, in response to a user grouping selection control 366 being selected, the client instance 102 may enable the system administrator to modify accessibility of the associated user or user grouping to the selected catalog entity. For example, the client instance 102 may display the user interface of FIG. 6 that displays the user-accessible list 272 for the selected catalog entity and/or the user interface FIG. 7 that displays the user-inaccessible list 292 for the selected catalog entity. The system administrator may then change the accessibility of the associated user or user grouping to the selected catalog entity (e.g., by adding or removing the associated user or user grouping to or from the user-accessible list 272 and/or the user-inaccessible list 292 for the selected catalog entity).

Figure 11:
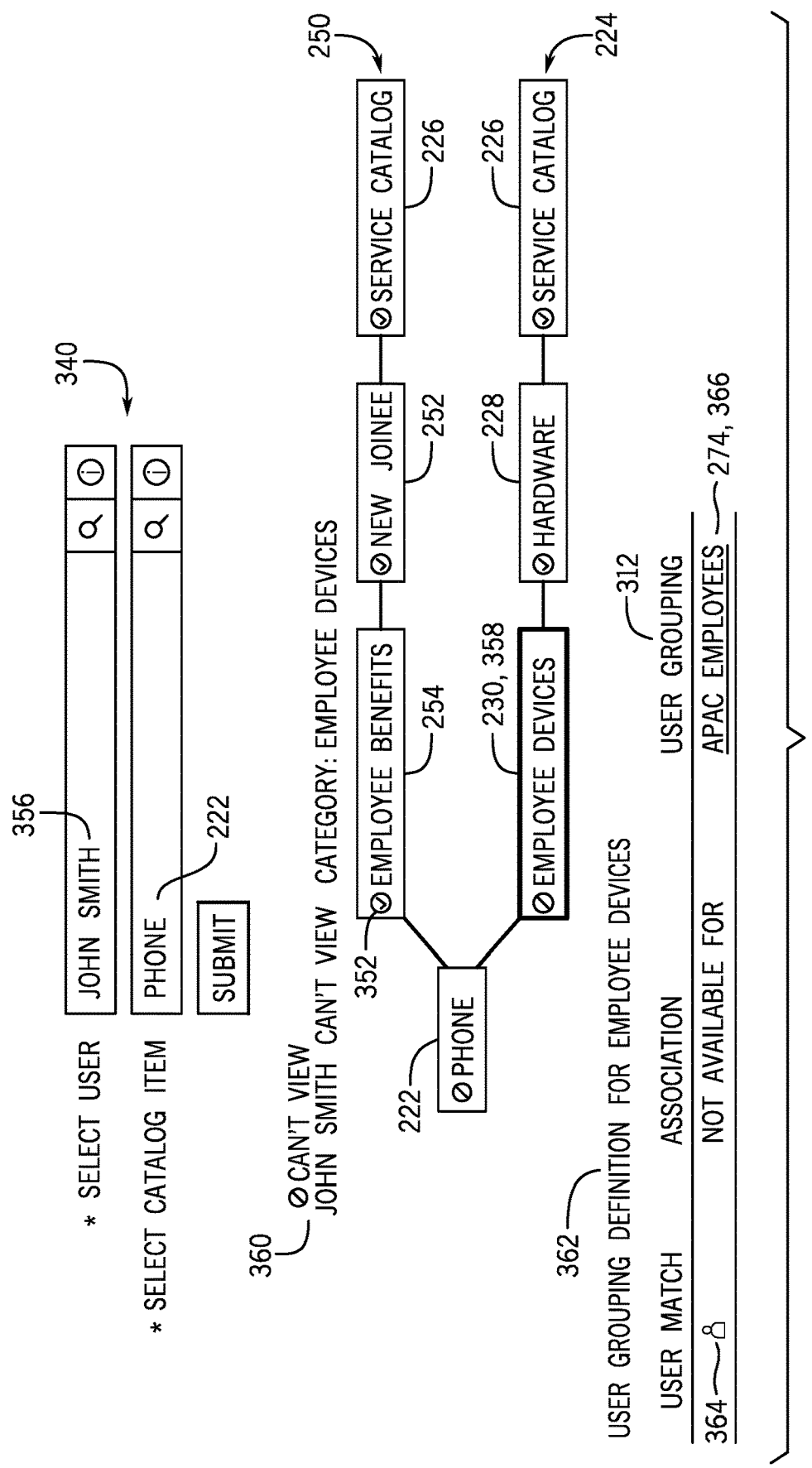
FIG. 11 is the example user interface of the catalog software application of FIG. 10 with a second catalog entity selected, in accordance to an embodiment of the present disclosure.

FIG. 11 is the example user interface 350 of the catalog software application of FIG. 10 with a second catalog entity (e.g., the Employee Devices category 230) selected, in accordance to an embodiment of the present disclosure. In particular, the system administrator may have selected the catalog entity selection control 358 associated with the Employee Devices category 230. In response to this selection, the client instance 102 may display the summary 360 that identifies the selected catalog entity (e.g., the Employee Devices category 230) and the accessibility of the catalog entity to the user 356 (e.g., "John Smith can't view Category: Employee Devices").

Also or alternatively in response to this selection, the client instance 102 may display the list 362 of user groupings 312 that are allowed to access the category Employee Devices 230. As illustrated, the list 362 includes the APAC Employees user grouping 274, which does not have access to the category Employee Devices 230. The list 362 also displays a user indication 364 that the user 356 is part of the APAC Employees user grouping 274.

In this manner, the client instance 102, through the catalog software application, may provide an easily digestible way for a system administrator to get a full picture of a user's accessibility to an information technology item (e.g., the catalog item 222) and conveniently change the user's accessibility to that information technology item.

Figure 12:
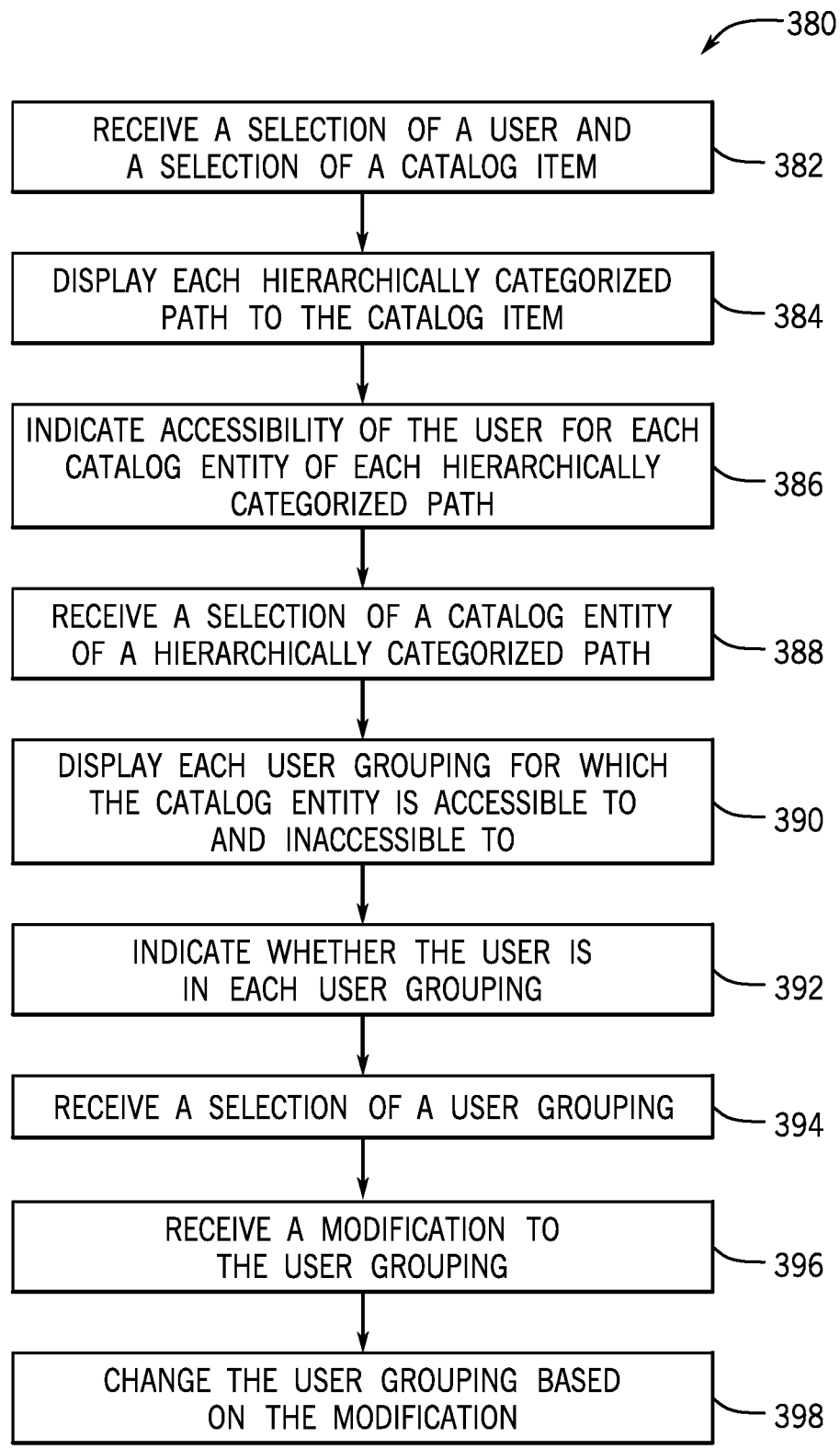
FIG. 12 is a flowchart of a process providing a hierarchical view and enabling convenient modification of user accessibility of catalog entities, according to embodiments of the present disclosure.

FIG. 12 is a flowchart of a process 380 for providing a hierarchical view and enabling convenient modification of user accessibility of catalog entities, according to embodiments of the present disclosure. The process 380 may be implemented in the form of a software application (e.g., the catalog software application) that includes instructions executable by at least one suitable processor of the cloud computing system 10, such as the processor 202. In particular, the process 380 may be performed by the client instance 102 as implemented by the processor 202. The illustrated process 380 is merely provided as an example, and in other embodiments, certain illustrated steps of the process 380 may be performed in other orders, skipped, or repeated, in accordance with the present disclosure.

As illustrated, in process block 382, the processor 202 receives a selection of a user and a selection of a catalog item. For example, a system administrator may select the user (e.g., John Smith 356) and the catalog item (e.g., the Phone catalog item 222) via the entry control 340 of FIG. 9.

In process block 384, the processor 202 displays each hierarchically categorized path to the catalog item. For example, in the user interface 350 of FIGS. 10 and 11, the processor 202 displays the two hierarchically categorized paths 224, 250 to the Phone catalog item 222.

In process block 386, the processor 202 indicates accessibility of the user for each catalog entity of each hierarchically categorized path. For example, in the user interface 350 of FIGS. 10 and 11, the processor 202 displays categories (e.g., the category Employee Benefits 254) of the hierarchically categorized paths 224, 250 having visual access indications 352 in the form of a checkmark to indicate that the respective category is accessible to the user 342. Similarly, the processor 202 displays categories and catalog items (e.g., the Phone catalog item 222) of the hierarchically categorized paths 224, 250 having visual access indications 354 in the form of a "no" symbol to indicate that the respective category or catalog item is inaccessible to the user 342.

In process block 388, the processor 202 receives a selection of a catalog entity of a hierarchically categorized path. For example, in the user interface 350 of FIGS. 10 and 11, the processor 202 provides catalog entity selection controls 358 that enable each catalog entity of the hierarchically categorized paths 224, 250 to be selected. When the system administrator selects a catalog entity selection control 358 associated with a respective catalog entity, the processor 202 receives a selection of the respective catalog entity. In the example of FIG. 10, the catalog entity selection control 358 associated with the Phone catalog item 222 has been selected (as evidenced by shading). As such, the processor 202 may receive a selection of the Phone catalog item 222.

In process block 390, the processor 202 displays each user grouping for which the catalog entity is accessible to and inaccessible to. For example, in the user interface 350 of FIGS. 10 and 11, the processor 202 displays a list 362 of user groupings 312 that are associated with a selected catalog entity, in response to the catalog entity selection control 358 being selected. In particular, in the example of FIG. 10, the processor 202 displays the list 362 that includes the APAC HR user grouping 294 which has access to the Phone catalog item 222, and the APAC Employees user grouping 274 and the US Sales user grouping 276 which do not have access to the Phone catalog item 222.

In process block 392, the processor 202 indicates whether the user is in each user grouping. For example, in the user interface 350 of FIGS. 10 and 11, the processor 202 displays a user icon 364 in the list 362 to indicate that a user 356 is part of a displayed user grouping 312. As illustrated, in the example of FIG. 10, the processor 202 displays the user icon 364 in the first row with the APAC HR user grouping 294 to indicate that the user 356 is part of the APAC HR user grouping 294.

In process block 394, the processor 202 receives a selection of a user grouping. For example, in the user interface 350 of FIG. 10, the processor 202 provides a user grouping selection control 366 for each user grouping 312 displayed in the list 362 that enables selection of the user grouping 312. When the system administrator selects a user grouping selection control 366 associated with a respective user grouping, the processor 202 receives a selection of the respective user grouping.

In process block 396, the processor 202 receives a modification to the user grouping. For example, in response to receiving the selection of the respective user grouping from process block 394, the processor 202 may display the user interface of FIG. 8 that defines the user grouping 312. The system administrator may then change the definition of the user grouping 312 (e.g., by adding or removing the user 356 from the user grouping 312). In some embodiments, in response to a user grouping selection control 366 being selected, the processor 202 may display the user interface of FIG. 6 that displays the user-accessible list 272 for the selected catalog entity and/or the user interface FIG. 7 that displays the user-inaccessible list 292 for the selected catalog entity. The system administrator may then change the accessibility of the associated user or user grouping to the selected catalog entity (e.g., by adding or removing the associated user or user grouping to or from the user-accessible list 272 and/or the user-inaccessible list 292 for the selected catalog entity).

In process block 398, the processor 202 then changes the user grouping based on the modification. That is, based on the system administrator changing the definition of a user grouping 312 and/or accessibility of the user grouping 312 to the selected catalog entity (e.g., the Phone catalog item 222), the processor 202 performs the change to the definition of the user grouping 312 and/or the accessibility of the user grouping 312 to the selected catalog entity, respectively.

In this manner, the process 380 may provide an easily digestible way for a system administrator to get a full picture of a user's accessibility to an information technology item (e.g., the catalog item 222) and conveniently change the user's accessibility to that information technology item.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A cloud computing system comprising:
one or more data centers;
a client instance hosted by the one or more data centers, wherein the client instance is accessible by one or more remote client networks; and
a catalog software application configured to be executed by the client instance, wherein the catalog software application is configured to organize catalog items into a plurality of paths of a plurality of hierarchical categories, wherein the catalog items comprise one or more devices, one or more services, or both, potentially accessible to a plurality of users associated with the client instance, wherein the catalog software application is configured to display a graphical user interface that comprises:
an entry control configured to enable entry of (i) a user belonging to a user grouping and (ii) a catalog item, wherein a plurality of user groupings correspond to different user roles within an enterprise;

a visual representation of the plurality of paths of the plurality of hierarchical categories leading to the catalog item, wherein the visual representation is displayed in the graphical user interface in response to entry, via the entry control, of (i) the user belonging to the user grouping and (ii) the catalog item;

a catalog entity selection control of each hierarchical category and the catalog item configured to enable selection of a respective hierarchical category or the catalog item; and a list of user groupings that comprises the user grouping that is allowed access to a selected hierarchical category or catalog item, wherein the list of user groupings is displayed in the graphical user interface in response to selection of the selected hierarchical category or catalog item via the catalog entity selection control; and wherein access to the selected hierarchical category or catalog item is modifiable by:
- a first user input indicative of adding the user or the user grouping to an accessible list for the selected hierarchical category or catalog item; and
- a second user input indicative of adding the user or the user grouping to an inaccessible list for the selected hierarchical category or catalog item.

2. The cloud computing system of claim 1, wherein the catalog entity selection control comprises an access indication of each hierarchical category or the catalog item, wherein the access indication is configured to indicate whether the user has access to the respective hierarchical category or the catalog item.

3. The cloud computing system of claim 2, wherein the access indication comprises a checkmark to indicate that the respective hierarchical category or the catalog item is accessible to the user, or a no symbol to indicate that the respective hierarchical category or the catalog item is not accessible to the user.

4. The cloud computing system of claim 1, wherein the catalog software application comprises:
a summary that identifies the selected hierarchical category or catalog item; and
accessibility of the selected hierarchical category or catalog item to the user.

5. The cloud computing system of claim 1, wherein the list comprises user groupings that are not allowed access to the selected hierarchical category or catalog item.

6. The cloud computing system of claim 5, wherein each user grouping comprises a user indication configured to indicate whether the user is a member of a respective user grouping.

7. The cloud computing system of claim 5, wherein each user grouping comprises a user grouping selection control configured to enable selection of a respective user grouping.

8. The cloud computing system of claim 7, wherein the client instance is configured to enable modification to the respective user grouping in response to receiving the selection of the respective user grouping.

9. The cloud computing system of claim 8, wherein the modification is associated with a definition of the respective user grouping or accessibility of the respective user grouping to the selected hierarchical category or catalog item.

10. The cloud computing system of claim 9, wherein the modification is associated with the definition of the respective user grouping comprises adding the user to the respective user grouping or removing the user from the respective user grouping.

11. The cloud computing system of claim 1, wherein a first path of the plurality of paths comprises a corresponding hierarchical category not present in a second path of the plurality of paths.

12. A tangible, non-transitory, machine-readable-medium, comprising machine-readable instructions that, when executed by a processor, cause the processor to perform acts comprising:
receiving, via an entry control of a graphical user interface displayed by a catalog software application, an entry of (i) a user belonging to a user grouping and (ii) a catalog item, wherein a plurality of user groupings correspond to different user roles within an enterprise, and wherein the catalog item comprises a device, a service, or both, potentially accessible to a plurality of users associated with a client instance configured to execute the catalog software application, and wherein the catalog software application is configured to organize catalog items into a plurality of paths of a plurality of hierarchical categories;

causing display of a visual representation of the plurality of paths of the plurality of hierarchical categories leading to the catalog item in the graphical user interface in response to receiving the entry, via the entry control, of (i) the user belonging to the user grouping and (ii) the catalog item;

receiving, via a catalog entity selection control of the graphical user interface, a selection of a hierarchical category of the plurality of hierarchical categories or the catalog item;

causing display of a list of user groupings in the graphical user interface in response to receiving the selection of the hierarchical category or the catalog item via the catalog entity selection control, wherein the list of user groupings comprises the user grouping that is allowed access to the selected hierarchical category or catalog item;

and wherein access to the selected hierarchical category or catalog item is modifiable by:
- a first user input indicative of adding the user or the user grouping to an accessible list for the selected hierarchical category or catalog item; and
- a second user input indicative of adding the user or the user grouping to an inaccessible list for the selected hierarchical category or catalog item.

13. The tangible, non-transitory, machine-readable-medium of claim 12, wherein the instructions cause the processor to perform acts comprising causing display of an indication of whether the user is in each user grouping of the list of user groupings.

14. The tangible, non-transitory, machine-readable-medium of claim 12, wherein the instructions cause the process to perform acts comprising:
receiving, via the graphical user interface, the first user input, the second user input, or both; and
modifying the access to the selected hierarchical category or catalog item based on receiving the first user input, the second user, or both.

15. The tangible, non-transitory, machine-readable-medium of claim 12, wherein the instructions cause the process to perform acts comprising:
receiving, via the graphical user interface, a modification to the user or the user grouping; and
changing the user grouping based on the modification.

16. A method for categorized hierarchically viewing and modifying user accessibility to a catalog item, the method comprising:
- receiving, via an entry control of a graphical user interface displayed by a catalog software application, an entry of (i) a user belonging to a user grouping and (ii) a catalog item, wherein a plurality of user groupings correspond to different user roles within an enterprise, wherein the catalog item comprises a device, a service, or both, potentially accessible to a plurality of users associated with a client instance configured to executed the catalog software application, and wherein the catalog software application is configured to organize catalog items into a plurality of paths of a plurality of hierarchical categories;
- displaying a visual representation of the plurality of paths of the plurality of hierarchical categories leading to the catalog item in the graphical user interface in response to receiving the entry, via the entry control, of (i) the user belonging to the user grouping and (ii) the catalog item;
- receiving, via a catalog entity selection control of the graphical user interface, a selection of a hierarchical category of the plurality of hierarchical categories or the catalog item;
- displaying a list of user groupings in the graphical user interface in response to receiving the selection of the hierarchical category or the catalog item via the catalog entity selection control, wherein the list of user groupings comprises the user grouping that is allowed access to the selected hierarchical category or catalog item;
- and wherein access to the selected hierarchical category or catalog item is modifiable by:
  - a first user input indicative of adding the user or the user grouping to an accessible list for the selected hierarchical category or catalog item; and
  - a second user input indicative of adding the user or the user grouping to an inaccessible list for the selected hierarchical category or catalog item.

17. The method of claim 16, comprising indicating accessibility of the user for each hierarchical category of the plurality of hierarchical categories and the catalog item.

18. The method of claim 16, comprising indicating whether the user is in each user grouping of the list of user groupings.

19. The method of claim 16, comprising:
- receiving, via the graphical user interface, the first user input, the second user input, or both; and
- performing a modification to the access to the selected hierarchical category or catalog item based on receiving the first user input, the second user input, or both.

20. The method of claim 16, wherein the catalog item is indicative of an information technology item potentially accessible to the plurality of users.

* * * * *